(12) United States Patent
Campbell

(10) Patent No.: US 7,350,689 B1
(45) Date of Patent: Apr. 1, 2008

(54) REUSABLE TAMPER EVIDENT ENVELOPE

(75) Inventor: Stephen Richard Campbell, Crownsville, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 669 days.

(21) Appl. No.: 11/017,541

(22) Filed: Dec. 17, 2004

(51) Int. Cl.
*B65D 27/34* (2006.01)
*B65D 27/14* (2006.01)
*B65D 27/06* (2006.01)
*B65D 33/14* (2006.01)

(52) U.S. Cl. .................. 229/314; 229/80; 229/301; 383/5

(58) Field of Classification Search ........ 229/301–305, 229/313, 314, 80; 383/5
See application file for complete search history.

(56) References Cited

U.S. PATENT DOCUMENTS

| | | | | |
|---|---|---|---|---|
| 3,411,699 A | * | 11/1968 | Pine et al. | 229/69 |
| 4,384,670 A | * | 5/1983 | Dicker | 229/69 |
| 4,733,817 A | | 3/1988 | Makowka | |
| 5,169,061 A | * | 12/1992 | Buescher | 229/305 |
| 5,172,855 A | * | 12/1992 | Coffey | 229/305 |
| 5,285,958 A | * | 2/1994 | Buescher | 229/305 |
| 5,341,985 A | * | 8/1994 | Peterson | 229/305 |
| 5,431,337 A | * | 7/1995 | Bell | 229/305 |
| 5,950,916 A | | 9/1999 | Santangelo | |
| 6,032,854 A | | 3/2000 | Greer et al. | |
| 6,227,443 B1 | * | 5/2001 | Minato | 229/305 |
| 6,402,022 B1 | * | 6/2002 | Fabel | 229/303 |
| 6,435,404 B1 | | 8/2002 | Feick | |

\* cited by examiner

*Primary Examiner*—Jes F. Pascua
(74) *Attorney, Agent, or Firm*—Eric Froehlich

(57) ABSTRACT

A reusable tamper-evident envelope includes a first substrate, a second substrate superimposed on the first substrate, at least one auxiliary substrate superimposed on and joined along one edge to the second substrate, and at least one seal along all but one edge joining the first substrate to the second substrate. Each auxiliary substrate is spaced a user-defined distance from the top edge of the first substrate. A perforation line, extending from the left side to the right side of both the first substrate and second substrates facilitate removal of a portion of the respective substrates. After an item is placed into the envelope, the user-activated seal along the remaining edge joins the first substrate to the second substrate. Subsequent uses are possible by removing portions of the first substrate and second substrate along the perforation lines and activating the auxiliary user-activated seal along the auxiliary substrate joining the first substrate to the second substrate.

31 Claims, 4 Drawing Sheets

REUSABLE TAMPER EVIDENT ENVELOPE

FIELD OF THE INVENTION

The present invention relates, in general, to a flexible bag and in particular, to a heat-sealed, tamper indicating envelope.

BACKGROUND OF THE INVENTION

Protecting the contents of an envelope from tampering is a very old problem. Historical methods of producing a tamper-evident envelope used a seal imprinted into candle wax to indicate the sender sealed the envelope and no tampering had occurred en route. Since these early methods, more sophisticated methods have developed. It is well known that banks, government agencies, and businesses ship important items from one location to another. For many of these items, the shipper wants to know whether the item has been tampered with after being placed into an envelope or bag. Modern tamper-evident envelopes use a plastic or paper sheet material for the envelope, with a pre-formed seal along all but one marginal edge. After an item is placed inside the envelope, the user activates the user-activated seal, sealing the envelope.

Upon opening the tamper-evident envelope, the plastic sheet material tears, giving a clear indication of tampering. The tamper-evident envelope is then discarded. Thus, each time an object is placed in a tamper-evident envelope, a new envelope must be used.

U.S. Pat. No. 4,733,817, entitled "ENVELOPE SYSTEM WITH MULTIPLE POCKETS" discloses an envelope comprising two or more pockets. In an alternate embodiment, a perforation line separates each pocket. One adhesive containing flap is provided for each pocket to secure the contents in the pocket individually. Each pocket is used only once. The envelope system may be used multiple times if a perforation line is not present, and at least one unused pocket is sent along with the contents sealed in one of the pockets. The present invention is not limited in this regard. U.S. Pat. No. 4,733,817 is hereby incorporated by reference into the specification of the present invention.

U.S. Pat. No. 5,950,916, entitled "SECURITY ENVELOPE" discloses a reusable envelope. An elongated fold-over flap is used with a plurality of adhesive layers to permit the security envelope to be reused. The user activates an unused adhesive layer farthest from the body of the envelope to seal the envelope. Upon reaching the destination, the recipient tears the fold-over flap along a pair of perforation lines separating the activated adhesive layer and an adjacent inactivated adhesive layer. Subsequent uses of the envelope are possible by activating each remaining adhesive layer in turn. The elongated fold-over flap creates a large unsecured space. Covert entry is possible by exploiting this unsecured area. The present invention is not limited in this regard. U.S. Pat. No. 5,950,916 is hereby incorporated by reference into the specification of the present invention.

U.S. Pat. No. 6,032,854, entitled "MULTIPLE-USE SEALABLE PACKAGES" discloses an improved tamper-evident container comprising a single perforation line between a pair of user-activated seals. The perforation line creates a line of weakness between the two adhesive layers, only one of which is activated. After the first use, the container may be used again by activating the second adhesive layer. The fold-over flap creates a large unsecured space. Covert entry is possible by exploiting this unsecured area. The present invention is not limited in this regard. U.S. Pat. No. 6,032,854 is hereby incorporated by reference into the specification of the present invention.

U.S. Pat. No. 6,435,404, entitled "RETURN MAILER" discloses a reusable mailing envelope comprising a plurality of adhesives deposited on a fold-over flap and a transparent sleeve for viewing insertable mailing indicia cards. As noted above, the fold-over flap creates a large unsecured space facilitating covert entry into the interior of this unsecured area. U.S. Pat. No. 6,435,404 is hereby incorporated by reference into the specification of the present invention.

There exists a need for a multiple use tamper-evident envelope with improved resistance to tampering.

SUMMARY OF THE INVENTION

It is an object of the present invention to provide a reusable tamper-evident envelope with enhanced protection against unauthorized entry.

A tamper-evident envelope according to the present invention has a first substrate and a second substrate superimposed upon the first substrate. The first substrate and the second substrate have a left marginal edge, a right marginal edge, a bottom marginal edge, and a top marginal edge.

The first substrate has at least one linear perforation line, spaced a user-definable distance from the top marginal edge. The second substrate has at least one nonlinear perforation line, spaced a user-definable distance from the top marginal edge. The nonlinear perforation line has two upper portions and a lower portion. The lower portion of the nonlinear perforation line in the second substrate extends farther from the top marginal edge than a corresponding collocated linear perforation line in the first substrate. All perforation lines extend from the left marginal edge to the right marginal edge.

At least one auxiliary substrate is superimposed on the second substrate, and has a bottom marginal edge and a top marginal edge. The top marginal edge of the at least one auxiliary substrate is aligned with the two upper portions of the corresponding nonlinear perforation line in the second substrate. An auxiliary seal along the bottom marginal edge of each auxiliary substrate and the second substrate joins the auxiliary substrate to the second substrate.

At least one seal along the left marginal edge, the right marginal edge, and the bottom marginal edge of the first substrate and the second substrate joins the first substrate to the second substrate. After an item is placed into the envelope, the envelope is sealed by activating the at least one user-activated seal along the remaining marginal edge.

The recipient can open the tamper-evident envelope by tearing the first substrate and the second substrate along the perforation line closest to the top marginal edge.

After a subsequent item is placed into the envelope, the envelope is sealed by activating the at least one user-activated auxiliary seal along the top marginal edge of the at least one auxiliary substrate.

In the preferred embodiment, the first substrate and the second substrate are made of tear and impact resistant plastic, and the seal and auxiliary seal are a heat weld seal.

In a first alternate embodiment, a portion of the first substrate extends beyond the second substrate. A perforation line allows the portion of the first substrate extending beyond the second substrate to be removed. In an alternate first alternate embodiment, at least one identifier is deposited on the portion of the first substrate extending beyond the second substrate matching at least one indicia deposited on the tamper-evident envelope.

DETAILED DESCRIPTION

Figure 1:
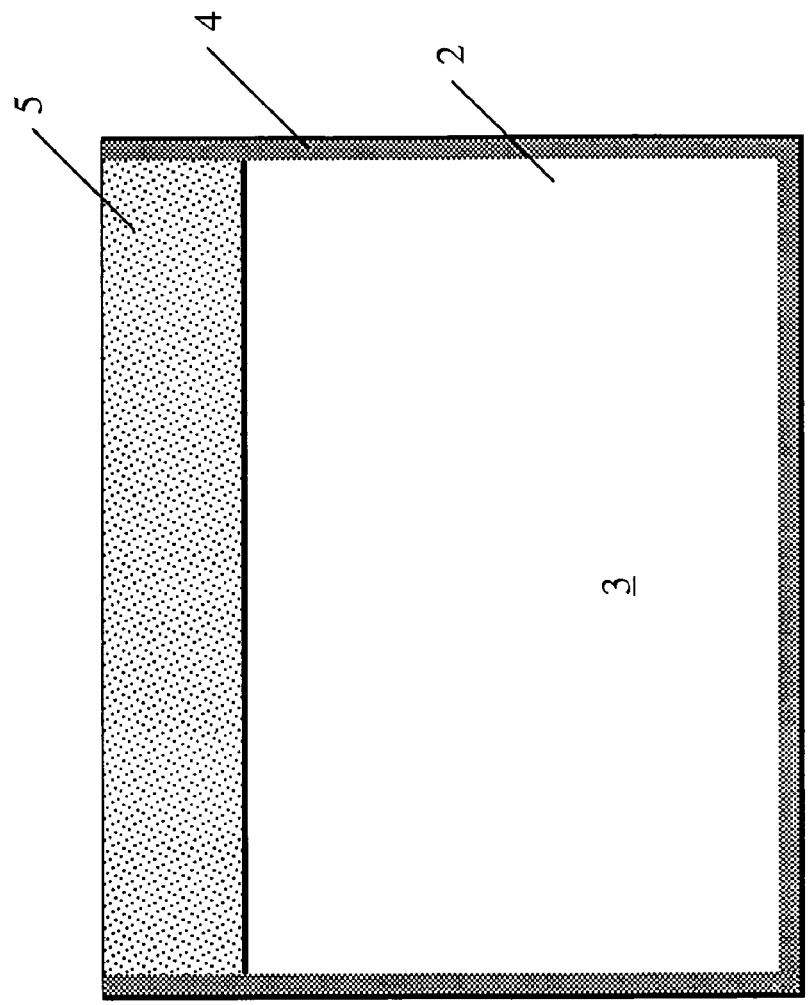
FIG. 1 is a front view of a typical prior art envelope.

Referring to FIG. 1, a prior art tamper-evident envelope 1 is shown. Prior art envelopes are constructed of a first substrate 2, a second substrate 3 superimposed upon the first substrate 2, a seal 4 along all but one of the marginal edges of the envelope, and a user-activated seal 5 along the remaining marginal edge. The user-activated seal 5 is typically an adhesive seal.

Figure 2:
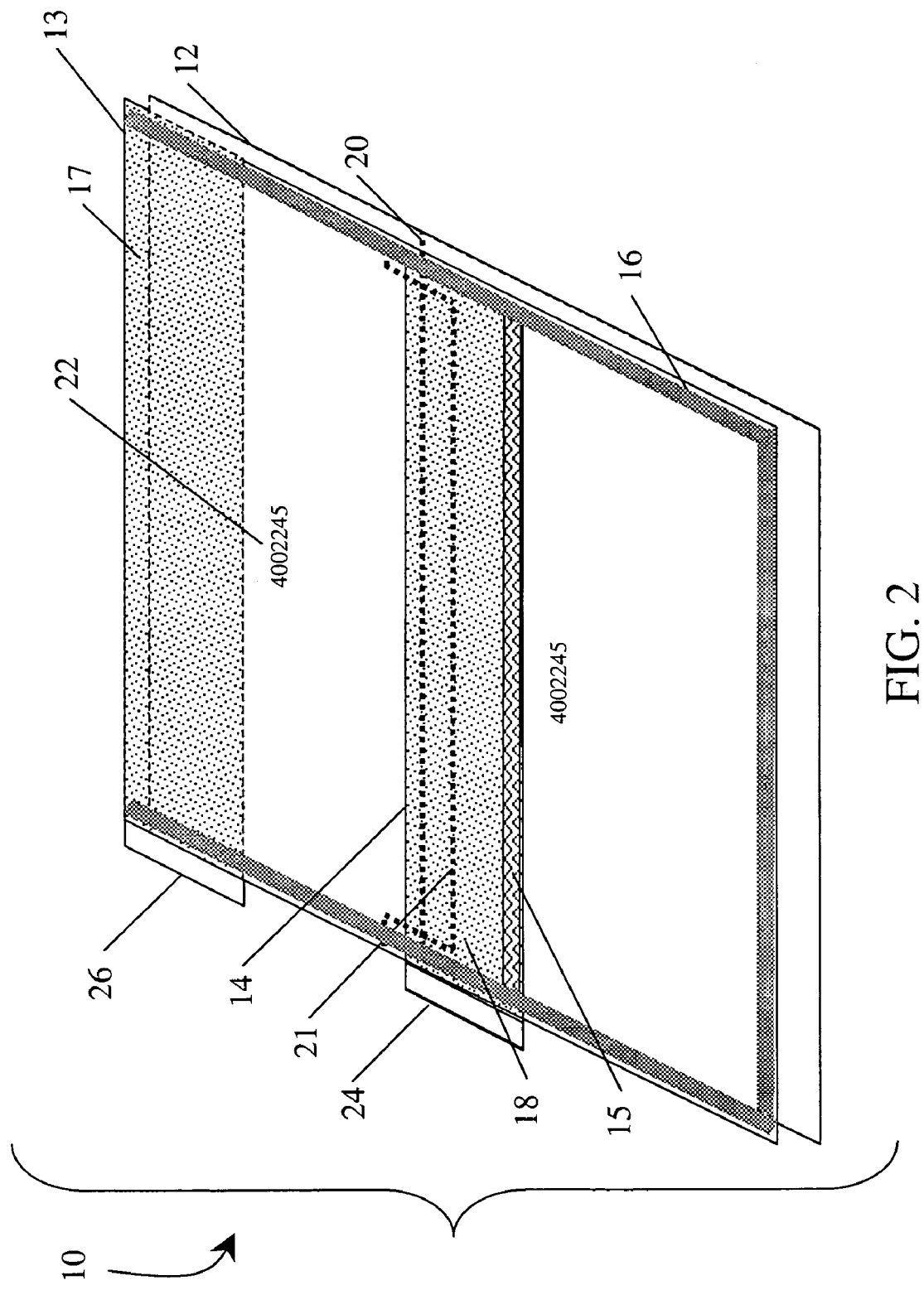
FIG. 2 is a perspective view of the present invention.

Referring to FIG. 2, a tamper-evident envelope 10 according to the present invention is shown. The tamper-evident envelope 10 comprises a first substrate 12, a second substrate 13 superimposed upon the first substrate 12, at least one auxiliary substrate 14 superimposed upon the second substrate 13, at least one auxiliary seal 15 along the bottom marginal edge of the auxiliary substrate 14 and the second substrate 13, at least one seal 16 along all but one marginal edge of the first substrate 12 and second substrate 13, at least one user-activated seal 17 along the remaining marginal edge of the first substrate 12 and second substrate 13, and at least one user-activated auxiliary seal 18 along the at least one auxiliary substrate 14. The first substrate 12, second substrate 13, and at least one auxiliary substrate 14 are preferably made of a flexible plastic sheet material. The plastic sheet material is preferably resistant to shear forces and impact forces. Other suitable or equivalent material may be used for the first substrate 12, the second substrate 13, and the at least one auxiliary substrate 14.

The first substrate 12 and the second substrate 13 have a left marginal edge, a right marginal edge, a bottom marginal edge, and a top marginal edge. While a generally rectangular tamper-evident envelope is shown, a tamper-evident envelope of the present invention may be made in a variety of shapes, such as square, round, or oblong without deviating from the scope of the invention.

Tamper-evident bags of the present invention may be made in any size to suit the object being stored therein. Plastic sheeting used in making the envelope may be clear or opaque, and may contain handles applied thereto for ease of transport. Those persons skilled in the art will recognized that the thickness of the plastic sheet material of the first substrate 12, the second substrate 13, and the at least one auxiliary substrate 14 may vary depending on the item typically stored in the tamper-evident envelope 10.

At least one linear perforation line 20 extends from the left marginal edge to the right marginal edge of the first substrate 12. The at least one linear perforation line 20 is spaced a user-definable distance from the top marginal edge of the first substrate 12. The number of linear perforation lines equals the number of times the tamper-evident envelope can be reused.

At least one nonlinear perforation line 21 extends from the left marginal edge to the right marginal edge of the second substrate 13. The nonlinear perforation line 21 has a lower portion and two upper portions. The lower portion of the at least one nonlinear perforation line 21 is spaced a user-definable distance from the top marginal edge of the second substrate 13 and its user definable distance is greater than the user-defined distance from the top marginal edge to the linear perforation line 20 contained on the first substrate 12. Each nonlinear perforation line 21 corresponds to a linear perforation line 20 in the first substrate 12.

In an alternate embodiment, at least one identifier 22 is printed on the first substrate 12, the second substrate 13, or both. Typical identifiers 22 include a serial number of the tamper-evident envelope 10, user instructions, a holographic image, a Radio Frequency Identification tag, and a magnetic strip. Preferably, a portion of the first substrate 12 or the second substrate 13 is treated to allow the user to write on the envelope with a ballpoint pen.

At least one auxiliary substrate 14 is superimposed upon the second substrate 13, and has a top marginal edge and a bottom marginal edge. The top marginal edge of the at least one auxiliary substrate 14 is aligned with the two upper portions of one of the at least one nonlinear perforation line 21, and joined to the second substrate 13 along the bottom marginal edge of the auxiliary substrate 14 with an auxiliary seal 15. The auxiliary seal 15 may be a heat weld, a sonic weld, an adhesive weld, any combination thereof, or any equivalent auxiliary seal.

At least one user-activated auxiliary seal 18 is applied along the top marginal edge of the auxiliary substrate 14. The at least one user activated seal 18 preferably is an adhesive seal. The adhesive used in tamper-evident envelope 10 adhesive seals are typically chosen to maintain their adhesion over a wide variety of factors. Typical factors include temperature, solvent, and shear force.

In an alternate embodiment, the user-activated auxiliary seal 15 has a plurality of adhesive layers, each offering better adhesion resistance to a different factor and therefore offering improved resistance to tampering. For instance, if three adhesive layers are used, one adhesive layer may have better adhesion resistance to cold temperatures, one adhesive layer may have better adhesion resistance to hot temperatures, and the third adhesive layer may have better adhesion resistance to solvents.

When an adhesive is used as the user-activated auxiliary seal 18, a release layer 24 is preferably used to prevent the adhesive from adhering the first substrate 12 to the second substrate 13 before the user is ready to seal the tamper-evident envelope 10.

In an alternate embodiment, at least one indicia is used in conjunction with the adhesive of the user-activated auxiliary seal 18 to give a visual indication of a tamper. The at least one indicia may be deposited on the second substrate 13, or the user-activated auxiliary seal 18. Shear force, such as by stretching, causes a recognizable pattern to emerge, indicating tampering has occurred.

To form the interior cavity of the tamper-evident envelope 10, the second substrate 13 is superimposed upon the first substrate 12 and at least one seal 16 joins the first substrate 12 to the second substrate 13 along the left marginal edge, the right marginal edge, and the bottom marginal edge. The seal 16 may be a heat weld, a sonic weld, an adhesive weld, any combination thereof, or any equivalent seal.

At least one user-activated seal 17 is applied along the top marginal edge. After an item is placed into the tamper-evident envelope 10, the user seals the remaining marginal edge of the first substrate 12 to the second substrate 13. The at least one user activated seal 17 may be a heat weld, a sonic weld, an adhesive weld, any combination thereof, or any equivalent seal.

In an alternate embodiment, the user-activated seal 17 is at least one adhesive seal joining the first substrate 12 to the second substrate 13. The adhesive used in tamper-evident envelope 10 adhesive seals are typically chosen to maintain their adhesion over a wide variety of factors.

In an alternate embodiment, the user-activated seal 16 has a plurality of adhesive layers, each offering better adhesion resistance to a different factor and therefore offering improved resistance to tampering.

Those persons skilled in the art will recognize that if an adhesive seal is used for the user-activated seal 16, the adhesive may be deposited onto the first substrate 12, the second substrate 13, or both substrates.

When an adhesive is used as the user-activated seal 16, a release layer 26 is preferably used to prevent the adhesive from adhering the first substrate 12 to the second substrate 13 before the user is ready to seal the tamper-evident envelope 10.

In an alternate embodiment, at least one indicia is used in conjunction with the adhesive of the user-activated seal 16 to give a visual indication of a tamper. The at least one indicia may be deposited on the first substrate 12, the second substrate 13, or the user-activated seal 16. Shear force, such as by stretching, cause a recognizable pattern to emerge, indicating tampering has occurred.

Tearing along the linear perforation line 20 and the nonlinear perforation line 21 opens the tamper-evident envelope 10. After an item is placed into the tamper-evident envelope 10, a remaining inactivated at least one auxiliary seal 15 is activated to seal the tamper-evident envelope 10 for a subsequent use.

The lower portion of the at least one nonlinear perforation line 21 in the second substrate 13, which extends farther from the top marginal edge than the linear perforation line 20 in the first substrate 12, allows the at least one user-activated auxiliary seal 18 to join the second substrate 13 to the first substrate 12.

Figure 3:
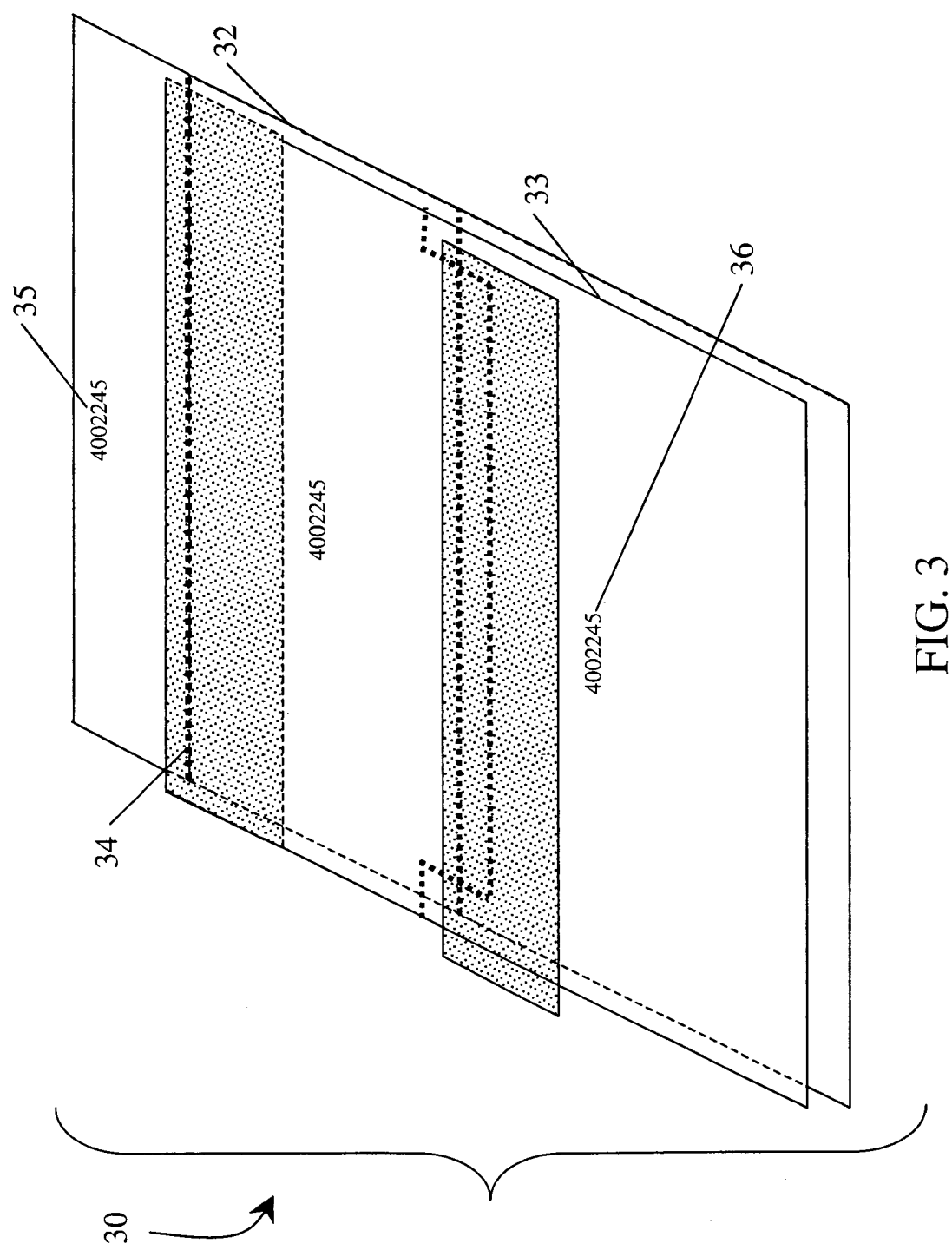
FIG. 3 is a perspective view of a first alternate embodiment of the present invention.

In a first alternate embodiment 30 shown in FIG. 3, a portion of the first substrate 32 extends beyond the second substrate 33. Preferably, a perforation line 34 extends from the left marginal edge to the right marginal edge, allowing the portion of the first substrate 32 extending beyond the second substrate 33 to be removed.

In an alternate embodiment, at least one identifier 35 is deposited on the portion of the first substrate 32 extending beyond the second substrate 33. The identifier 35 may be a serial number of the tamper-evident envelope 30, user instructions, a holographic image, a Radio Frequency Identification tag, and a magnetic strip. Preferably, one of the identifiers 35 deposited on the portion of the first substrate 32 extending beyond the second substrate 33 is the same as the identifier, 36 deposited on the first substrate 32, the second substrate 33, or both. The removable portion of the first substrate 32 provides a receipt for the sending user.

Figure 4:
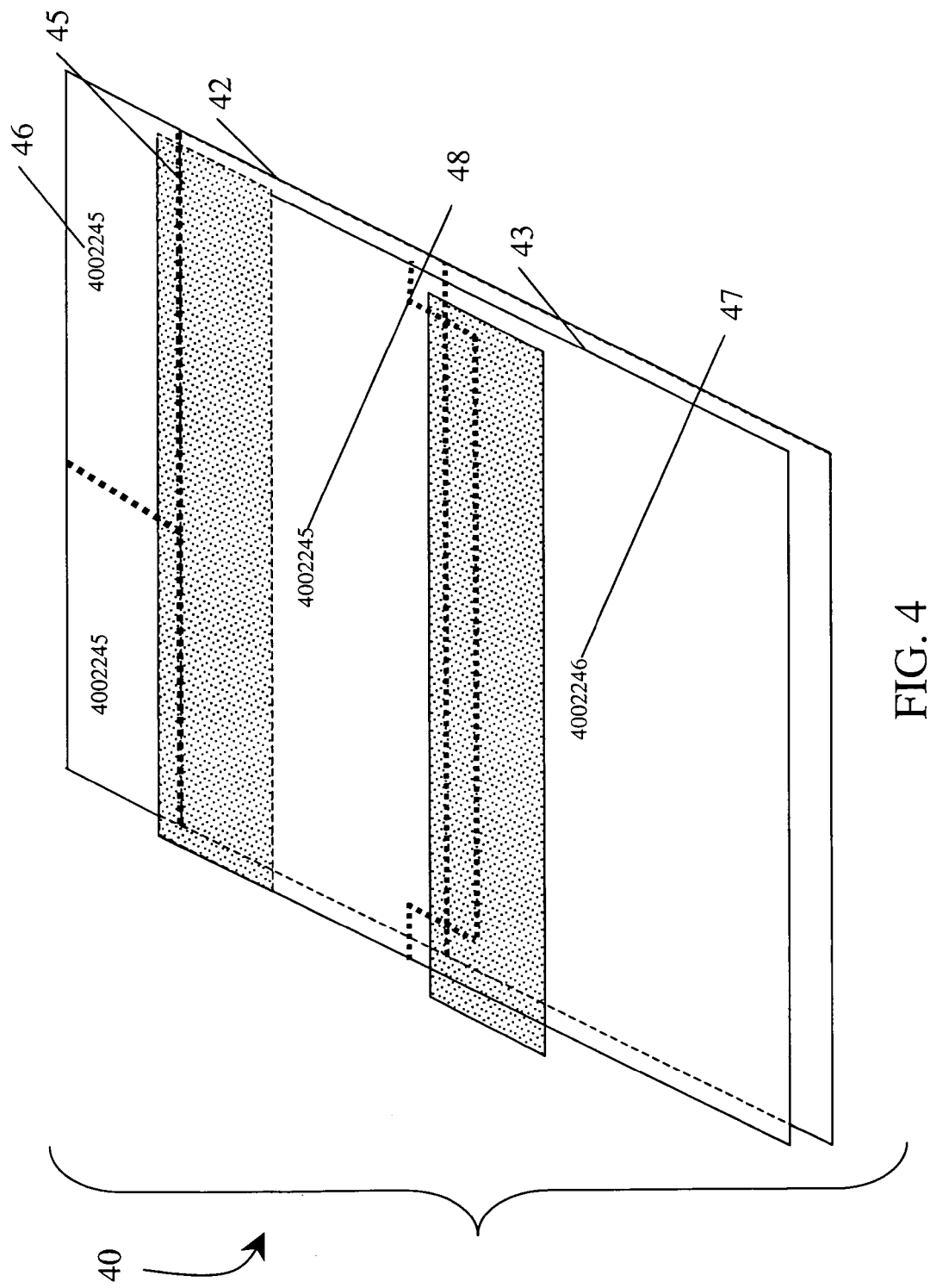
FIG. 4 is a perspective view of a second alternate embodiment of the present invention.

In a second alternate embodiment 40 shown in FIG. 4, a vertical perforation line 44 splits the portion of the first substrate 42 extending beyond the second substrate 43, forming a pair of receipts. The vertical perforation line extends from the top marginal edge of the first substrate 42 to the perforation line 45 extending from the left marginal edge to the right marginal edge. Unique identifiers 46 are deposited on each receipt and correspond to identical identifiers 47 and 48 on the tamper-evident envelope 40.

While the preferred embodiments of the invention have been illustrated and described, it will be apparent to those of ordinary skill in the art that various changes and modifications may be made without deviating from the inventive concepts set forth above.

What is claimed is:

1. A tamper-evident envelope, comprising:
    a) a first substrate, said first substrate having a left marginal edge, a right marginal edge, a bottom marginal edge, and a top marginal edge;
    b) at least one linear perforation line in said first substrate, each of said at least one linear perforation line spaced a user-definable distance from said top marginal edge and extending from said left marginal edge to said right marginal edge;
    c) a second substrate superimposed on said first substrate, said second substrate having a left marginal edge, a right marginal edge, a bottom marginal edge, and a top marginal edge;
    d) at least one nonlinear perforation line in said second substrate, wherein each nonlinear perforation line has a lower portion and two upper portions, each of said at least one nonlinear perforation line spaced a user-definable distance from said top marginal edge and extending from said left marginal edge to said right marginal edge, the lower portion of the nonlinear perforation line extending a user-definable distance from said top marginal edge, wherein said user-definable distance from said top marginal edge is greater than the corresponding linear perforation line in said first substrate;
    e) at least one auxiliary substrate superimposed on said second substrate, said at least one auxiliary substrate having a bottom marginal edge and a top marginal edge, said top marginal edge of said at least one auxiliary substrate aligned with the two upper portions of the corresponding nonlinear perforation line in said second substrate;
    f) at least one auxiliary seal along said bottom marginal edge of said auxiliary substrate and said second substrate, said at least one auxiliary seal joining said auxiliary substrate to said second substrate;
    g) at least one seal along said left marginal edge, said right marginal edge, and said bottom marginal edge of said second substrate and said first substrate, said at least one seal joining said first substrate to said second substrate;
    h) at least one user-activated seal along the top marginal edge of said second substrate, said at least one user-activated seal joining said first substrate to said second substrate; and
    i) at least one user-activated auxiliary seal along the top marginal edge of said at least one auxiliary substrate, said at least one user-activated auxiliary seal joining said first substrate to said second substrate when a corresponding linear perforation line in said first substrate and a corresponding nonlinear perforation line in said second substrate are removed.

2. The device of claim 1, wherein said first substrate, said second substrate, and said third substrate comprise tear and impact resistant plastic.

3. The device of claim 2, further comprising at least one identifier deposited on said tamper-evident envelope, where said at least one identifier is selected from the group of identifiers consisting of a printed code, a holographic image, a Radio Frequency Identification tag, a magnetic strip, a user-definable indicia, any equivalent identifier, and any combination thereof.

4. The device of claim 3, wherein a portion of said first substrate extends a user-definable distance beyond said second substrate.

5. The device of claim 4, wherein said portion of said first substrate extending beyond said second substrate further comprises a perforation line, wherein said portion of said first substrate is removable by tearing along said perforation line.

6. The device of claim 5, further comprising at least one identifier on said portion of said first substrate extending beyond said second substrate, wherein at least one of said at least one identifier is identical to the at least one identifier deposited on said tamper evident envelope.

7. The device of claim 6, wherein said at least one seal is selected from the group of seals consisting of a heat weld, a sonic weld, an adhesive seal, any equivalent seal, and any combination thereof.

8. The device of claim 7, wherein said at least one auxiliary seal is selected from the group of auxiliary seals consisting of a heat weld, a sonic weld, an adhesive seal, any equivalent auxiliary seal, and any combination thereof.

9. The device of claim 8, wherein said at least one user-activated seal comprises at least one adhesive seal, wherein an adhesive of said at least one user-activated seal is deposited in at least one user definable pattern.

10. The device of claim 9, wherein said at least one user-activated seal is sensitive to a factor selected from the group of factors consisting of a solvent, a temperature, a shear force, any equivalent factor, and any combination thereof.

11. The device of claim 10, wherein said user-activated seal further comprises a tamper evident user-activated seal indicia in at least one user definable pattern, said tamper evident user-activated seal indicia providing an indication of tampering if stretched.

12. The device of claim 11, further comprising a release layer removably overlying said at least one user-activated seal.

13. The device of claim 12, wherein said at least one user-activated auxiliary seal comprises at least one adhesive seal, wherein an adhesive of said at least one user-activated auxiliary seal is deposited in at least one user definable pattern.

14. The device of claim 13, wherein said at least one user-activated auxiliary seal is sensitive to a factor selected from the group of factors consisting of a solvent, a temperature, a shear force, any equivalent factor, and any combination thereof.

15. The device of claim 14, further comprising a release layer removably overlying said at least one user-activated auxiliary seal.

16. The device of claim 15, wherein said user-activated auxiliary seal further comprises a tamper evident user-activated seal indicia in at least one user definable pattern, said tamper evident user-activated seal indicia providing an indication of tampering if stretched.

17. The device of claim 1, wherein said first substrate, said second substrate, and said third substrate comprise tear and impact resistant plastic.

18. The device of claim 1, further comprising at least one identifier deposited on said tamper-evident envelope, where said at least one identifier is selected from the group of identifiers consisting of a printed code, a holographic image, a Radio Frequency Identification tag, a magnetic strip, a user-definable indicia, any equivalent identifier, and any combination thereof.

19. The device of claim 18, wherein a portion of said first substrate extends a user-definable distance beyond said second substrate.

20. The device of claim 19, wherein said portion of said first substrate extending beyond said second substrate further comprises a perforation line, wherein said portion of said first substrate is removable by tearing along said perforation line.

21. The device of claim 1, further comprising at least one identifier on said portion of said first substrate extending beyond said second substrate, wherein at least one of said at least one identifier is identical to the at least one identifier deposited on said tamper evident envelope.

22. The device of claim 1, wherein said at least one seal is selected from the group of seals consisting of a heat weld, a sonic weld, an adhesive seal, any equivalent seal, and any combination thereof.

23. The device of claim 1, wherein said at least one auxiliary seal is selected from the group of auxiliary seals consisting of a heat weld, a sonic weld, an adhesive seal, any equivalent auxiliary seal, and any combination thereof.

24. The device of claim 23, wherein said at least one user-activated seal comprises at least one adhesive seal, wherein an adhesive of said at least one user-activated seal is deposited in at least one user definable pattern.

25. The device of claim 24, wherein said at least one user-activated seal is sensitive to a factor selected from the group of factors consisting of a solvent, a temperature, a shear force, any equivalent factor, and any combination thereof.

26. The device of claim 25, further comprising a release layer removably overlying said at least one user-activated seal.

27. The device of claim 1, wherein said user-activated seal further comprises a tamper evident user-activated seal indicia in at least one user definable pattern, said tamper evident user-activated seal indicia providing an indication of tampering if stretched.

28. The device of claim 27, wherein said at least one user-activated auxiliary seal comprises at least one adhesive seal, wherein an adhesive of said at least one user-activated auxiliary seal is deposited in at least one user definable pattern.

29. The device of claim 28, wherein said at least one user-activated auxiliary seal is sensitive to a factor selected from the group of factors consisting of a solvent, a temperature, a shear force, any equivalent factor, and any combination thereof.

30. The device of claim 29, wherein said user-activated auxiliary seal further comprises a tamper evident user-activated seal indicia in at least one user definable pattern, said tamper evident user-activated seal indicia providing an indication of tampering if stretched.

31. The device of claim 30, further comprising a release layer removably overlying said at least one user-activated auxiliary seal.

* * * * *